UNITED STATES PATENT OFFICE.

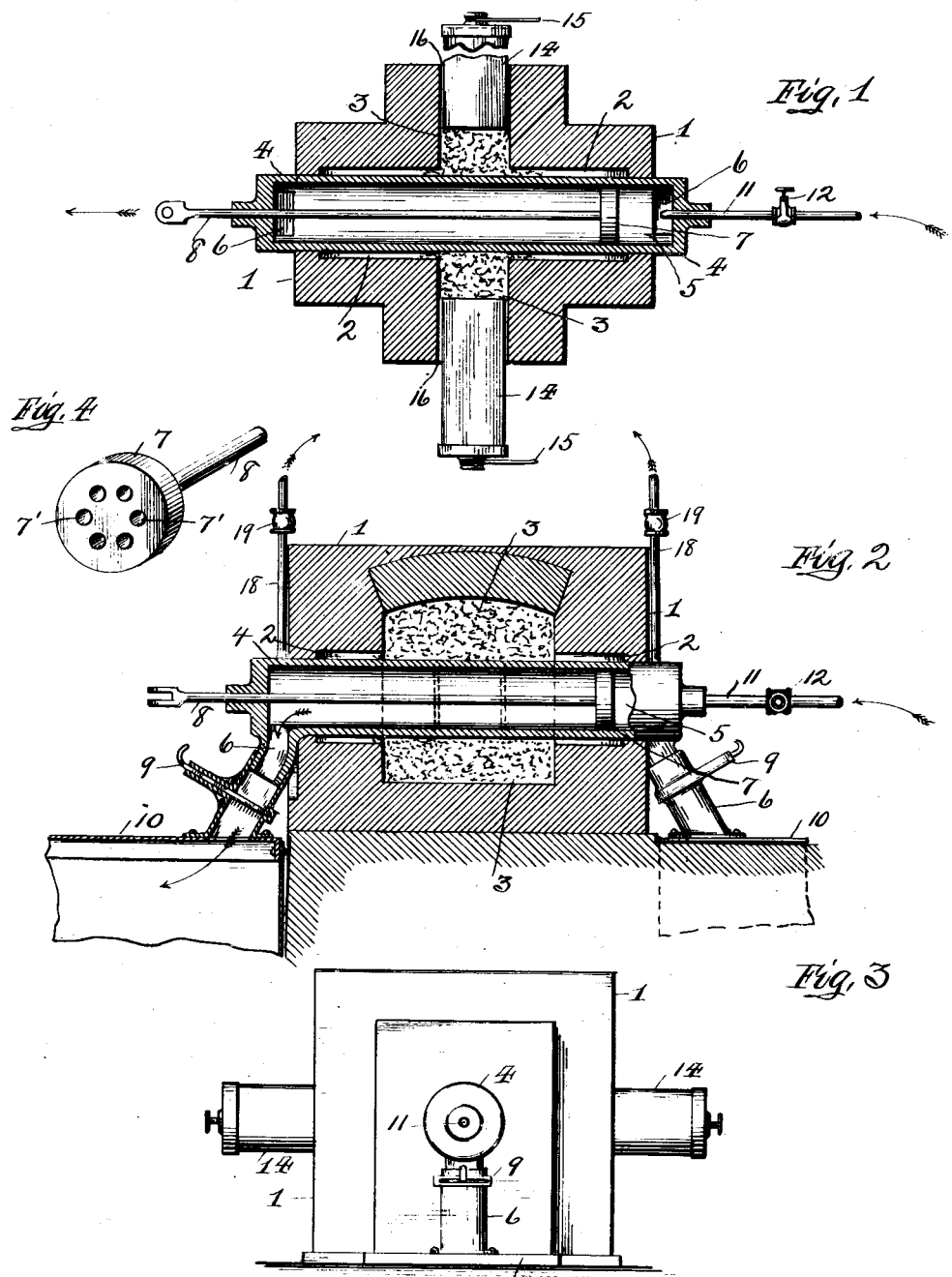

GUSTAVE FERNEKES, OF PITTSBURGH, PENNSYLVANIA, ASSIGNOR TO JOHN A. SNEE, OF WEST ELIZABETH, PENNSYLVANIA.

METHOD OF PRODUCING CARBON OR LAMPBLACK.

1,066,894.      Specification of Letters Patent.      Patented July 8, 1913.

Application filed May 1, 1911. Serial No. 624,353.

*To all whom it may concern:*

Be it known that I, GUSTAVE FERNEKES, a citizen of the United States, residing at Pittsburgh, in the county of Allegheny and State of Pennsylvania, have invented certain new and useful Improvements in Methods of Producing Carbon or Lampblack; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the production of carbon or lamp black from gaseous hydrocarbons, particularly natural gas, and the basis of the invention is my discovery that immediate and substantially complete dissociation of methane results when a stream of gas containing the same is discharged into a heat zone of not less than 1,300° C., such zone being maintained at or as near atmospheric pressure as possible. A further feature of my discovery is that the resulting carbon black is chemically pure, none of the intermediate products such as naphthalene being produced, this being due as I believe to immediately or suddenly subjecting the whole of the gaseous stream to a much higher heat than that at which such products form. With the carbon black free from impurities it need not be calcined, an operation heretofore necessary where chemically pure carbon produced from methane is desired. I have found that temperatures below 1,300° C. are not effective, and the best results are attained with 1,700° C. and upward.

The process is preferably practised in a flame-excluded chamber or retort which is capable of withstanding the requisite high heat, in apparatus of desirable construction the chamber being formed of alundum and provided with electrical heating means.

A form of apparatus for practising the invention is illustrated in the accompanying drawings, Figure 1 being a sectional plan of the same, and Fig. 2 a sectional elevation taken through the longitudinal axis of the retort. Fig. 3 is an end elevation. Fig. 4 is a detail of the scraper.

Referring to the drawings, the furnace structure 1 is built up of suitable refractory material, being hollow at 2 to receive the tubular retort 4, the ends of which protrude, and extending downwardly from these ends are the carbon ducts 6 which discharge through dampers 9 into receivers 10. The furnace structure 1 is formed with heating chamber 3 which intersects a considerable portion of cavity 2. Entered in opposite end openings 16 of chamber 3 are electrodes 14 to which are connected circuit wires 15 from a source of electrical energy. The space between the electrodes and surrounding retort 4 is filled with resistance material, preferably broken carbon, as shown in Figs. 1 and 2. Natural gas or other gaseous hydrocarbon containing methane is admitted to retort 4 through pipe 11, the flow being regulated by valve 12. Retort 4 is formed of highly refractory material, alundum being suitable as it will withstand approximately 2,000° C.

In practising the process with the apparatus described, retort 4 is heated to the requisite temperature, the resistance material with a current of sufficient amperes sustaining the retort at such heat as is required, which should not be below 1,300° C. and which may run as high as 2,000° C., a desirable working temperature being about 1,700° C. The methane flowing from pipe 11 into the high heat zone thus maintained is instantly decomposed and separated into its elements, carbon and hydrogen, the former of light flocculent character floating and settling in retort 4, and the hydrogen gas passing off through outlets 18 which may be controlled by valves 19. A scraper 7 fitting bore 5 of retort 4, and actuated by rod 8 may be utilized for moving the accumulated carbon toward one end or the other of the retort where it is discharged downwardly through ducts 6 into receivers 10. Openings 7' through the scraper afford free passage for the gas. While dampers 9 are normally closed to prevent air from circulating in the retort, they are nevertheless opened quite frequently to pass the carbon, so that there is no opportunity for pressure to accumulate in the retort, and hence the dissociating process is conducted as nearly as possible at atmospheric pressure. Working conditions are thus more easily maintained; in fact sustained pressure within the retort would be disadvantageous as it would retard segregation of the gas. The dissociation is complete, being accomplished instantly and as rapidly as the stream of methane flows into the retort. Furthermore, and as a result of the new process, the carbon is chemically pure, none of the intermediate products, such as naphthalene, forming in the high dissociating temperature. Thus the carbon is free from impurities and subsequent calcining, heretofore necessary in order to obtain chemically pure carbon from methane, is rendered unnecessary.

Apparatus for practising the process may be variously constructed and arranged, with the retort disposed horizontally or otherwise, as may be preferred.

I claim:—

1. The process of producing lamp black from methane which consists in subjecting methane immediately to a temperature which dissociates it into carbon and hydrogen without producing intermediate products.

2. The process of producing lamp black from methane which consists in immediately subjecting methane at substantially atmospheric pressure to a temperature which dissociates it into carbon and hydrogen.

3. The production of lamp black from methane by a continuous process which consists in passing a stream of methane into a zone of sufficiently high temperature to immediately and completely dissociate it into carbon and hydrogen.

4. The production of lamp black from methane by a continuous process which consists in passing a stream of methane into a zone of substantially atmospheric pressure and of sufficiently high temperature to immediately dissociate the methane into carbon and hydrogen without producing intermediate products.

5. The process of producing lamp black from methane which consists in immediately subjecting it to a temperature of not less than 1,300° C.

In testimony whereof, I affix my signature, in presence of two witnesses.

GUSTAVE FERNEKES.

Witnesses:
 JOHN A. SNEE,
 F. J. KORRIGAN.